April 10, 1945.                C. J. MORGAN                2,373,137
                           AIRPLANE LANDING GEAR
                             Filed April 8, 1943
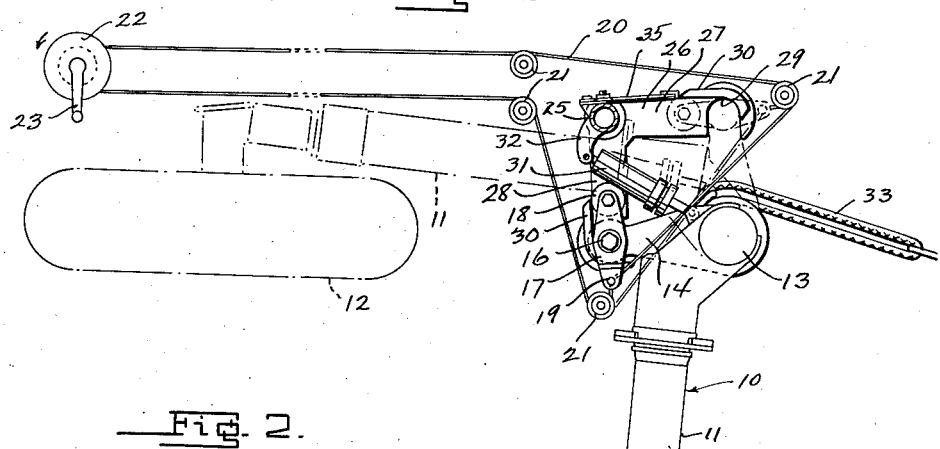
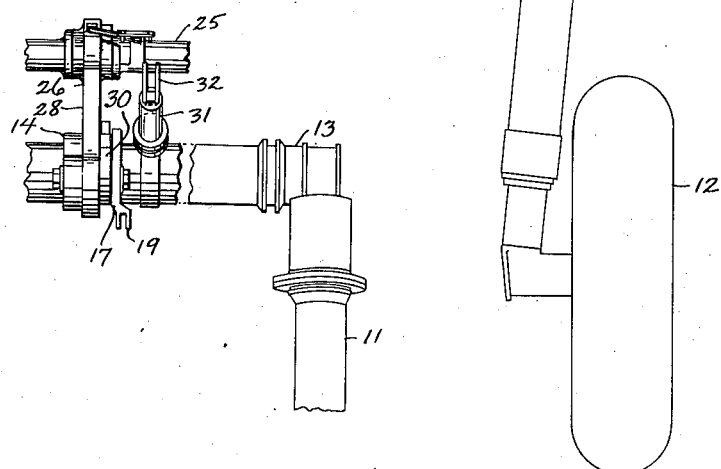
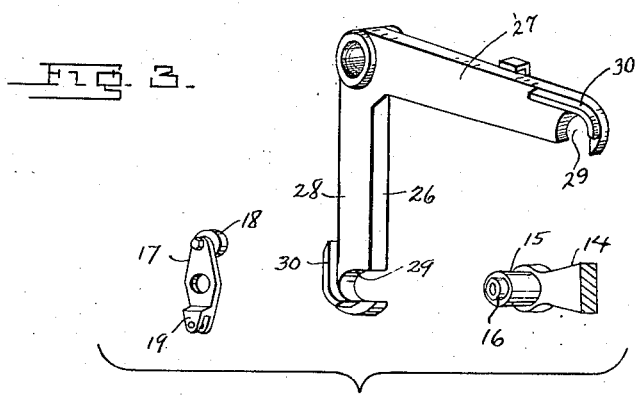
INVENTOR
Conrad J. Morgan
BY
ATTORNEY Patented Apr. 10, 1945

2,373,137

UNITED STATES PATENT OFFICE 2,373,137

AIRPLANE LANDING GEAR

Conrad J. Morgan, United States Marine Corps

Application April 8, 1943, Serial No. 482,267

5 Claims. (Cl. 244—102)

(Granted under the act of March 3, 1883, as amended April 30, 1928; 370 O. G. 757)

The present invention relates to improvements in aircraft landing gear and more particularly to improved retracting and locking mechanism therefore and the primary object of the invention is to provide an improved mechanically operated landing gear.

Another object of the present invention is the provision of an aircraft landing gear that is lighter, more positive in action and therefore safer, resulting in fewer "wheels up" landings.

A still further object of the present invention is the provision of a landing gear that is easier to install, maintain and repair, especially in the field, and one that permits of greater economy in material and construction.

Other objects and advantages of the invention will become apparent during the course of the following detailed description taken in connection with the accompanying drawing forming a part of this specification, and in which drawing:

Figure 1 is a view in front elevation of the improved landing gear in extended position, and showing in broken lines, the position of parts when the landing gear is retracted.

Figure 2 is a fragmentary view in side elevation of the landing gear.

Figure 3 is a perspective view showing in disassembled relation, locking means preferably forming a part of the invention.

In the drawing, which for the purpose of illustration, shows only a preferred embodiment of the invention, and wherein similar reference characters denote corresponding parts throughout the several views, the numeral 10 designates generally the improved landing gear, including a conventional shock strut 11, rotatably supporting at one end a suitable landing wheel 12, the other ends of the shock strut being fixed to a rock shaft 13 for swinging movement therewith. Fixed to the rock shaft 13 is a retracting arm 14 carrying at its free end a pin 15 having a reduced end portion 16 pivotally supporting a small unlocking beam 17. Rotatably mounted on one end of the beam 17 is a roller 18, the opposite end of the beam 17 being shaped to form a clevis 19. Fastened to clevis 19 are opposite sections of a cable 20 trained about suitable pulleys 21 and capable of being alternately reeled in and payed out, as by a suitable drum 22 and a hand crank 23.

Fixed in spaced parallel relation to the rock shaft 13 is a stub shaft 25 supporting a locking lever 26 including a pair of arms 27, 28 forming an angle of slightly less than 90°. Each arm 27, and 28 is provided at its free end portion with a notch 29 for receiving the pin 15 on the retracting arm 14, and a laterally projecting cam portion 30 for engagement by the roller 18 on the unlocking beam 17. Attached to a bracket on the rock shaft 13 is one end of a snubbing strut 31 having its opposite end secured to the stub shaft 25 as by a bracket 32. Also attached to the bracket on the rock shaft 13 is a bungee device 33 of a strength to almost balance the weight of the landing gear. Connected between the stub shaft 25 and the locking lever 26 is a suitable spring 35 for urging the locking lever toward its neutral or locked position as shown in Figure 1.

In the operation of the landing gear and with the gear disposed in the extended position as shown, counterclockwise rotation of the drum 22 will reel in the upper section of the cable 20, and pay out the lower section thereof so as to swing the unlocking beam 17 in a counterclockwise direction. The roller 18 through engagement with the cam 30 will swing the locking lever to the left so that the pin 15 on the retracting arm 14 will clear the notch 29. Further rotation of the drum 22 will reel in the upper cable section so as to turn the unlocking beam and draw the retracting arm 14 toward the position shown by broken lines in Figure 1. As the notch 29 of the arm 27 aligns with the pin 15, the spring 35 causes the notch to snap over the pin, thus securely locking the gear. It will be noted that the unlocking beam has turned approximately 90° about its own axis and is now in position to unlock the gear for movement in the opposite direction. As the gear is moved down into landing position, the locking lever is moved clockwise by the pin 15 beyond its neutral position, and at the proper point the notch 29 on arm 28 snaps over the pin 15 by reason of the spring 35 urging the locking lever back toward neutral position. The arms 27 and 28 being at an angle less than 90°, the locking lever is slightly off its neutral position when the gear is locked in either of its extreme positions. The snubbing strut prevents any sudden or heavy load being applied to the cable 20 during retraction or extension, due to any acceleration of the aircraft that might have a component in the pivotal movement of the landing gear about the axis of shaft 13.

Various changes may be made in the form of the invention herein shown and described without departing from the spirit of the invention or the scope of the following claims.

The invention described herein may be manufactured and/or used by or for the Government of the United States of America for governmental purposes without the payment of any royalties thereon or therefor.

What is claimed is:

1. In a retractable landing gear for aircraft, a gear retracting arm swingable between spaced positions for retracting or extending the gear, a gear locking lever having arms for interlocking engagement with the gear retracting arm when the gear retracting arm is swung into either one of said spaced positions, resilient means connected to said gear locking lever for urging the gear locking lever into interlocking engagement with the gear retracting arm in either one of said positions, an unlocking beam pivoted on said gear retracting arm and swingable into camming engagement with said locking lever to move said lever out of interlocking engagement with the gear retracting arm, means connected to said unlocking beam for swinging said unlocking beam to release said locking lever and for moving said gear retracting arm between said spaced positions.

2. In a retractable landing gear for aircraft, a gear retracting arm swingable between spaced positions for retracting or extending the gear, a gear locking lever having arms for interlocking engagement with the gear retracting arm when the gear retracting arm is swung into either one of said spaced positions, resilient means connected to said gear locking lever for urging the gear locking lever into interlocking engagement with the gear retracting arm in either one of said positions, an unlocking beam pivoted on said gear retracting arm and swingable into camming engagement with said locking lever to move said lever out of interlocking engagement with the gear retracting arm, and a single means for swinging said unlocking beam to release said locking lever and for moving said gear retracting arm between said spaced positions.

3. In a retractable landing gear for aircraft, a gear retracting arm swingable between spaced positions for retracting or extending the gear, a pin fixed to the free end portion of the gear retracting arm, a gear locking lever having arms each provided with a notch for interlocking engagement with said pin, resilient means connected to said gear locking lever for urging the gear locking lever into interlocking engagement with said pin, an unlocking beam pivoted on said gear retracting arm and swingable into camming engagement with said locking lever to move said lever out of interlocking engagement with said pin, means connected to said unlocking beam for swinging said unlocking beam to release said locking lever and for moving said gear retracting arm between said spaced positions.

4. In a retractable landing gear for aircraft, a gear retracting arm swingable between spaced positions for retracting or extending the gear, a pin fixed to the free end portion of the gear retracting arm, a gear locking lever having arms each provided with a notch for interlocking engagement with said pin, resilient means connected to said gear locking lever for urging the gear locking lever into interlocking engagement with said pin, an unlocking beam pivoted on said gear retracting arm and swingable into camming engagement with said locking lever to move said lever out of interlocking engagement with said pin, means connected to said unlocking beam for swinging said unlocking beam to release said locking lever and for moving said gear retracting arm between said spaced positions and resilient means urging the gear retracting arm toward its gear retracting position.

5. In a retractable landing gear for aircraft, a gear retracting arm swingable between spaced positions for retracting or extending the gear, a pin fixed to the free end portion of the gear retracting arm, a gear locking lever having arms each provided with a notch for interlocking engagement with said pin, resilient means connected to said gear locking lever for urging the gear locking lever into interlocking engagement with said pin, an unlocking beam pivoted on said gear retracting arm and swingable into camming engagement with said locking lever to move said lever out of interlocking engagement with said pin, means connected to said unlocking beam for swinging said unlocking beam to release said locking lever and for moving said gear retracting arm between said spaced positions and means for retarding movement of the gear retracting arm.

CONRAD J. MORGAN.